(12) United States Patent
Cao et al.

(10) Patent No.: US 9,456,475 B2
(45) Date of Patent: Sep. 27, 2016

(54) LED LIGHT SOURCE WITH REDUCED FLICKER

(75) Inventors: ZhiJian Cao, Shenzhen Guangdong (CN); Xuewei Dai, Shenzhen Guangdong (CN); Zeke Wei, Shenzhen (CN); XiHe Zhuang, Shenzhen (CN)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 14/350,810

(22) PCT Filed: Aug. 23, 2012

(86) PCT No.: PCT/EP2012/066431
§ 371 (c)(1),
(2), (4) Date: May 13, 2014

(87) PCT Pub. No.: WO2013/053521
PCT Pub. Date: Apr. 18, 2013

(65) Prior Publication Data
US 2014/0252972 A1 Sep. 11, 2014

(30) Foreign Application Priority Data
Oct. 13, 2011 (CN) .......................... 2011 1 0310626

(51) Int. Cl.
*H05B 37/02* (2006.01)
*H05B 33/08* (2006.01)

(52) U.S. Cl.
CPC ...... *H05B 33/0815* (2013.01); *H05B 33/0887* (2013.01); *Y02B 20/346* (2013.01)

(58) Field of Classification Search
CPC .................... H05B 33/0815; H05B 33/0887
USPC .................................. 315/194, 51, 291, 32
See application file for complete search history.

(56) References Cited

U.S. PATENT DOCUMENTS

2011/0043121 A1  2/2011 Matsuda et al.
2011/0057578 A1* 3/2011 Otake et al. .................. 315/291
(Continued)

FOREIGN PATENT DOCUMENTS

CN    101049048 A    10/2007
CN    101998734 A    3/2011
(Continued)

OTHER PUBLICATIONS

International Search Report issued in the corresponding PCT application No. PCT/EP2012/066431, dated Nov. 26, 2012.
(Continued)

*Primary Examiner* — Douglas W Owens
*Assistant Examiner* — Syed M Kaiser
(74) *Attorney, Agent, or Firm* — Viering, Jentschura & Partner mbB (57) ABSTRACT

An illumination control system includes a rectifying device, a damping device for inhibiting flickering, and a load circuit, wherein the illumination control system further comprises a recognizing control circuit connected between the rectifying device and the damping device, and wherein the recognizing control circuit includes a recognizing signal output module and a switch module, the recognizing signal output module generates a first control signal indicating that a dimmer is not connected upstream the rectifying device or the dimmer is connected upstream the rectifying device and reaches a predetermined dimming level and a second control signal indicating that the dimmer is connected upstream the rectifying device and does not reach the predetermined dimming level and at least one damping resistor of the damping device is short connected or is connected by means of the switch module according to the first control signal or the second control signal.

17 Claims, 6 Drawing Sheets

(56) References Cited

U.S. PATENT DOCUMENTS

| | | | |
|---|---|---|---|
| 2011/0298374 A1* | 12/2011 | Lenk et al. | 315/50 |
| 2013/0113375 A1* | 5/2013 | Leung et al. | 315/85 |
| 2014/0203721 A1* | 7/2014 | Qiao et al. | 315/201 |

FOREIGN PATENT DOCUMENTS

| | | | |
|---|---|---|---|
| CN | 102014546 A | 4/2011 |
| EP | 2302980 A2 | 3/2011 |
| WO | 2006046207 A1 | 5/2006 |

OTHER PUBLICATIONS

Chinese Search Report based on Application No. 2011103106269(1 page of English translation) dated Jul. 10, 2015 (Reference Purpose Only).

* cited by examiner

LED LIGHT SOURCE WITH REDUCED FLICKER

RELATED APPLICATIONS

The present application is a national stage entry according to 35 U.S.C. §371 of PCT application No.: PCT/EP2012/066431 filed on Aug. 23, 2012, which claims priority from Chinese application No.: 201110310626.9 filed on Oct. 13, 2011, and is incorporated herein by reference in its entirety.

TECHNICAL FIELD

Various embodiments relate to an illumination control system and a method of controlling the illumination control system.

BACKGROUND

Figure 1:
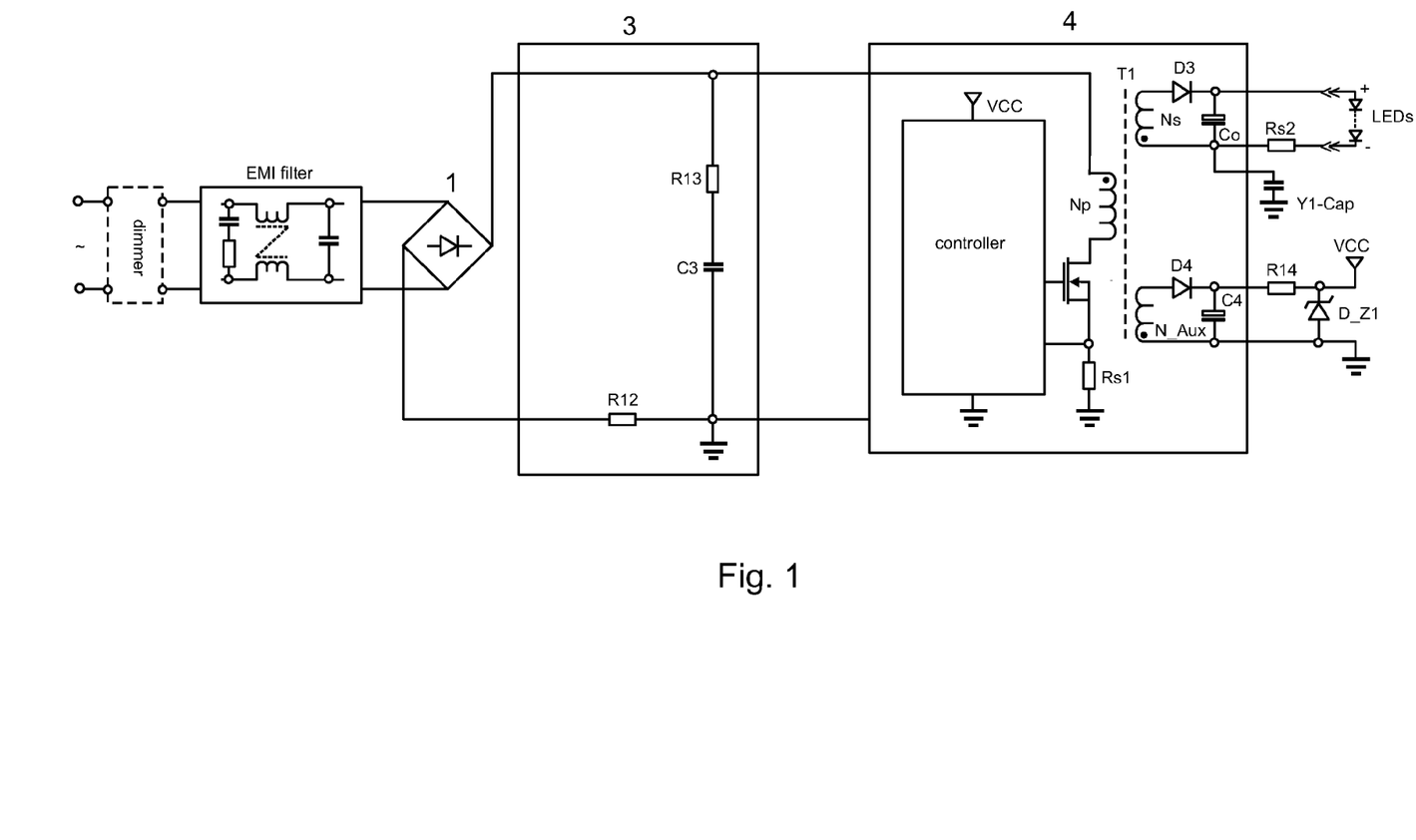
FIG. 1 is a related illumination control system.

In the modern illuminating devices, especially in the LED illuminating devices, an improved solution having a dimming function is put forward in order to obtain luminance adapted to different environments. Particularly, this function is mainly realized by a TRIAC phase-cut dimmer. For instance, in a common dimming system for an LED illuminating device as shown in FIG. 1, the LED will be caused to flicker when the TRIAC phase-cut dimmer is connected to an LED driving circuit, then an additional damping circuit is usually needed for inhibiting the flickering. In such a damping circuit, a main current flows through a high-power damping resistor R12 (for instance, 150 R/2 W herein) having a big resistance value, and subsequently flows into a dimmer for controlling the LED luminance. As the damping resistor R12 has consumed a lot of power, the power of the LED driving circuit is reduced by 3%-5%. In addition, the service lifetime of electronic elements of the circuit also will be adversely affected after the electric energy consumed on the damping resistor R12 is converted into heat energy.

In order to improve the power of the LED driver, the power lost on the high-power damping resistor should be reduced; as a result, a dynamic switch is often used. The disadvantage of such method lies in that the dynamic switch used cannot recognize whether the driver is connected with a dimmer, i.e., an operation state of the dimmer cannot be recognized, which thus results in that, when a driving circuit of an illuminating device is not connected with the dimmer or the dimmer has been adjusted to a predetermined dimming level, R12 is still in an operation state and further affects an output power of the driving circuit of the illuminating device.

SUMMARY

Therefore, various embodiments provide an illumination control system and a method of controlling the same. The illumination control system according to various embodiments can provide a high output power according to different practical requirements, reduces a power loss on a damping device during a non-dimming process, and has a strong universality.

An illumination control system is provided according to various embodiments. The illumination control system includes a rectifying device, a damping device for inhibiting flickering and a load circuit, and further includes a recognizing control circuit connected between the rectifying device and the damping device, wherein the recognizing control circuit includes a recognizing signal output module and a switch module, wherein the recognizing signal output module generates a first control signal indicating that a dimmer is not connected upstream the rectifying device or the dimmer is connected upstream the rectifying device and reaches a predetermined dimming level and a second control signal indicating that the dimmer is connected upstream the rectifying device and does not reach the predetermined dimming level and at least one damping resistor of the damping device is short connected or is connected by means of the switch module according to the first control signal or the second control signal.

The starting point of the solutions of the present disclosure lies in, upon processing of an input signal, recognizing whether there is the dimmer upstream the illumination control system or an operation state of the dimmer, and controlling the operation state of the damping device of the illumination control system according to a recognizing result, especially controlling an operation state of a high-power damping resistor thereof; consequently, when there is no dimmer or the dimmer has reached the predetermined dimming level, the high-power damping resistor of the damping device may be short connected to prevent the damping resistor from maintaining an operation state consuming power all the time. The illumination control system configured in such a manner is adapted to both an illumination circuit having the dimmer and an illumination circuit without the dimmer that directly controls a state of the illuminating device, has a strong universality, and can control the damping device according to the dimmer dimming level predetermined by a user, so that unnecessary power loss may be reduced as much as possible, for instance, a driving power of the illuminating device may be improved by 3%-5%.

According to various embodiments, the recognizing signal output module includes a voltage sampling device configured to sample a voltage output from the rectifying device to output a sample voltage, a phase-cut angle detecting device configured to detect a phase-cut angle of the sample voltage to output a detection output signal, and an evaluating device configured to evaluate the detection output signal to generate the first control signal or the second control signal. In the recognizing signal output module, different control signals are detected, recognized and generated, respectively, in a manner of detecting the phase-cut angle, as a result, various different input signals may be compared and recognized precisely.

According to various embodiments, the voltage sampling device includes a plurality of resistors in serial connection. An ideal voltage dividing effect is obtained by arranging suitable resistors, thus, a voltage input value adapted to detection is obtained. The voltage sampling device herein outputs a voltage signal in a form of one-way double frequency sine wave.

According to various embodiments, the phase-cut angle detecting device is a first comparator that compares the phase-cut angle of the sample voltage with a minimum phase-cut angle of a first reference value to output the detection output signal. The first reference value and corresponding minimum phase-cut angle thereof may be determined by the person skilled in the art through, for instance, software simulation or simple formula, according to the application environments.

According to various embodiments, the first comparator outputs the detection output signal in a low-level state of the first control signal when the phase-cut angle is smaller than the minimum phase-cut angle; and the first comparator outputs the detection output signal in a high-level state of the second control signal when the phase-cut angle is bigger than the minimum phase-cut angle. The detection output signal herein is output as a rectangular wave having different duty cycles.

According to various embodiments, the first reference value is supplied by a first reference voltage source, and may be a constant voltage supplied by the first reference voltage source.

According to various embodiments, the first reference value is input into a positive pin of the first comparator, the sample voltage is input into a negative pin of the first comparator, and a first output end of the first comparator outputs the detection output signal.

According to various embodiments, the evaluating device includes an integrating device configured to integrate the detection output signal to obtain a first evaluating voltage, and a second comparator. The second comparator compares the first evaluating voltage with a second reference value predetermined to output the first control signal or the second control signal. Two different control signals may be obtained upon processing the detection output signal and comparing the same with the second reference value that also may be predetermined.

According to various embodiments, the integrating device is an RC circuit, wherein an integrating resistor is connected between the first output end of the first comparator and a negative pin of the second comparator, and an integrating capacitor has one end connected between the first output end of the first comparator and the negative pin of the second comparator, and the other end connected to ground.

According to various embodiments, the second reference value is input into a positive pin of the second comparator, and the first evaluating voltage is input into the negative pin of the second comparator, and a second output end of the second comparator outputs the first control signal or the second control signal. Preferably, the second reference value is supplied by a second reference voltage source.

According to various embodiments, the switch module includes a switch component that is in parallel connection with the damping resistor and is turned on according to the first control signal to short connect the damping resistor, or turned off according to the second control signal to connect the damping resistor in the damping device. Preferably, the switch component is a MOSFET. The source and the drain of the MOSFET respective connect the both ends of the damping resistor. When the MOSFET is turned on according to the first control signal in a high-level state, a current flow is directly through the MOSFET to short connect the damping resistor. And when the MOSFET is in an open-circuit state according to the second control signal in a low-level state, the damping resistor is connected in the damping device for inhibiting light flickering.

According to various embodiments, the switch module further includes a switch drive resistor that is connected, at one end, to the second output end of the second comparator, and at the other end, to a gate of the MOSFET.

According to various embodiments, the first comparator and the second comparator are integrated into a single chip such as LM358. This reflects advantages such as high integrity and easy debugging of the illumination control system according to the present disclosure.

Various embodiments further relate to a method of controlling said illumination control system, including steps of:
(a) generating a first control signal indicating that a dimmer is not connected upstream a rectifying device or, the dimmer is connected upstream the rectifying device and reaches a predetermined dimming level or a second control signal indicating that the dimmer is connected upstream the rectifying device and does not reach the predetermined dimming level; and
(b) at least one damping resistor of a damping devices is short connected or connected by means of a switch module according to the first control signal or the second control signal.

According to various embodiments, step (a) including substeps of:
(a1) obtaining a voltage output from the rectifying device and outputting a sample voltage to a phase-cut angle detecting device via a voltage sampling device;
(a2) generating a detection output signal upon comparing a phase-cut angle of the sample voltage with a minimum phase-cut angle of a first reference value and outputting the detection output signal to an evaluating device; and
(a3) integrating the detection output signal to generate a first evaluating voltage and comparing the first evaluating voltage with a second reference value predetermined to generate a first control signal or a second control signal.

The phase-cut angle is detected in substep (a1) as followings: outputting the detection output signal in a low-level state when the phase-cut angle is smaller than the minimum phase-cut angle; and outputting the detection output signal in a high-level state when the phase-cut angle is bigger than the minimum phase-cut angle. The detection output signal in a low-level state is output in a form of rectangular wave having a small duty cycle, and the detection output signal in a high-level state is output in a form of rectangular wave having a big duty cycle.

According to various embodiments, the first control signal or the second control signal is generated in substep (a3) as followings: in the evaluating device, outputting the first control signal in a high-level state upon comparing the first evaluating voltage obtained by integrating the detection output signal with the second reference value when the detection output signal input is in a low-level state, and outputting the second control signal in a low-level state upon comparing the first evaluating voltage obtained by integrating the detection output signal with the second reference value when the detection output signal input is in a high-level state. As a result, the on and off of a switch component such as MOSFET may be controlled by the control signals at different levels.

It shall be understood that both the above general description and the following detailed description are for illustrative and explanatory purposes in order to provide further description of the claimed present disclosure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 2:
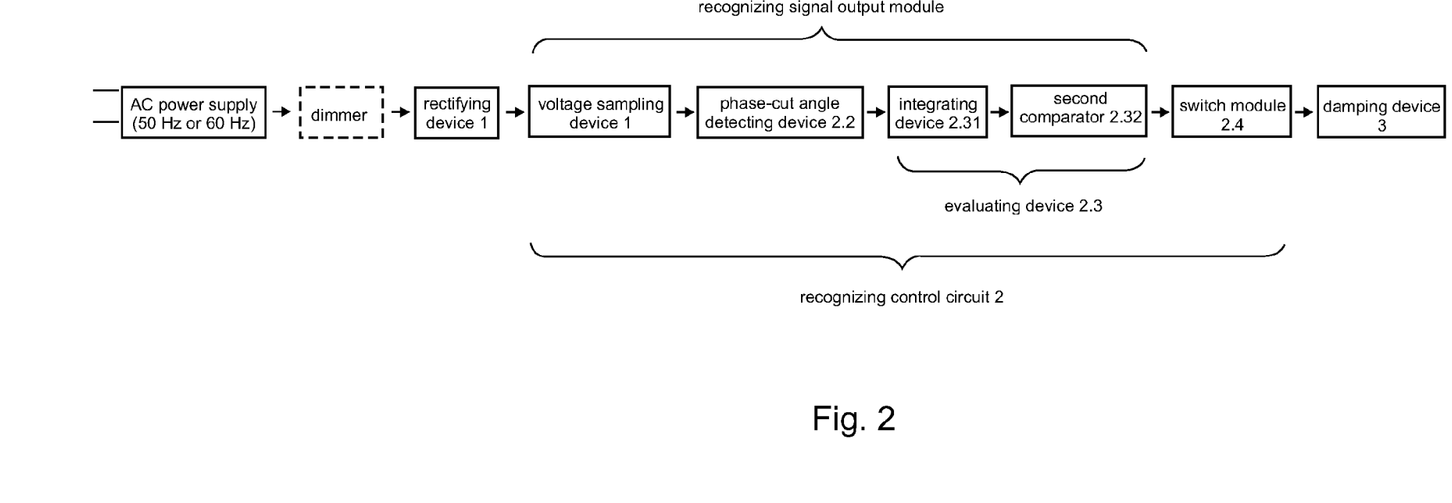
FIG. 2 is a schematic block diagram of an illumination control system according to the present disclosure.

It can be seen clearly from FIG. 2 that in an illumination control system according to the present disclosure, a recognizing control circuit 2 is connected between a rectifying device 1 into which an alternating current is input and a damping device 3 for inhibiting flickering. The recognizing control circuit 2 comprises a voltage sampling device 2.1 configured to obtain a voltage from the rectifying device 1, a phase-cut angle detecting device 2.2 configured to compare a phase-cut angle of a sample voltage with a minimum phase-cut angle of a first reference value, an evaluating device 2.3 configured to evaluate a detection output signal to generate a control signal and a switch module 2.4 configured to implement the control signal, wherein the evaluating device 2.3 comprises an integrating device 2.31 and a second comparator 2.32.

In the illumination control system according to the present disclosure, a size relation between a phase-cut angle A of the sample voltage input and a minimum phase-cut angle Amin predetermined according an application condition is judged by detecting the phase-cut angles, and a comparison result is output to the evaluating device 2.3 in a form of rectangular wave signal, as a result, on and off states of the damping resistor of the damping device 3 is controlled. Thus, the damping resistor is short connected when a dimmer is not connected upstream the rectifying device 1 or the dimmer is connected upstream the rectifying device land reaches a predetermined dimming level; and the damping resistor is connected in the damping device 3 when the dimmer is connected upstream the rectifying device land does not reach the predetermined dimming level, so as to assure an illuminating device not to flicker when the dimmer dims.

Figure 3:
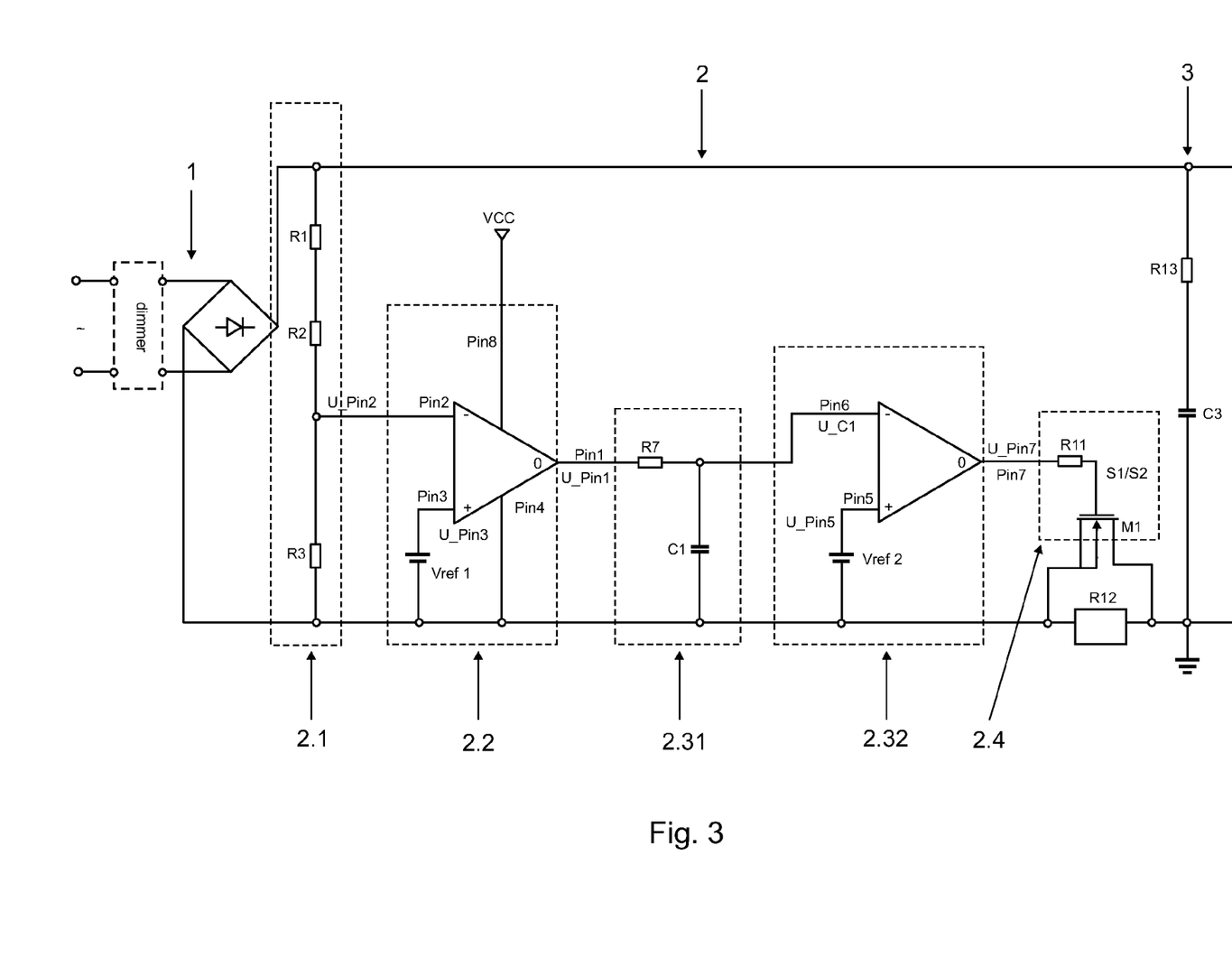
FIG. 3 is a circuit diagram of an illumination control system according to the present disclosure.

It can be seen in detail, in conjunction with FIG. 3, that the rectifying device 1 is a rectifier bridge, and a symmetrical sine wave voltage is adjusted to be a one-way double frequency sine wave voltage after passing through the rectifying device 1. The voltage sampling device 2.1 constituted by three resistors R1, R2 and R3 in serial connection is connected in parallel with the rectifying device 1, so that a sample voltage U_Pin2 for recognition may be tapped from the resistor R3. Therefore, a duration of maintaining a low-voltage state at a negative pin Pin2 is associated with whether an input end of the power supply is connected with the dimmer and is proportional to the phase-cut angle A of the sample voltage U_Pin2. The sample voltage U_Pin2 is input into a negative pin of the phase-cut angle detecting device 2.2 in a form of the first comparator. A first reference value U_Pin3 in a form of a first reference voltage source Vref1 is input into a positive pin Pin3 of the first comparator 2.2, and the first reference value U_Pin3 has a corresponding minimum phase-cut angle Amin. The phase-cut angle A and the minimum phase-cut angle Amin are compared in the first comparator 2.2 to output a detection output signal U_Pin1 in a form of rectangular wave having different duty cycles from a first output end Pin1 according to different comparison results. An integrating device 2.31 constituted by an integrating resistor R7 and an integrating capacitor C1 performs integration on the detection output signal U_Pin1, and inputs a resulted first evaluating voltage U_C1 to a negative pin Pin6 of a second comparator 2.32. A second reference value U_Pin5 in a form of a second reference voltage source Vref2 is connected at a positive pin of the second comparator 2.32. A first control signal S1 or a second control signal S2 may be obtained at a second output end Pin7 upon further comparing the first evaluating voltage U_C1 and the second reference value U_Pin5, consequently, a MOSFET M1 of a switch module 2.4 may be controlled to short connect or connect a damping resistor R12 of the damping device 3. It should be indicated herein that the predetermined dimming level of the dimmer may be a maximum nominal dimming level or may be a dimming level standard re-defined by a user smaller than the maximum nominal dimming level.

When the dimmer is not connected upstream the rectifying device 1 or the dimmer reaches the predetermined dimming level, the first evaluating voltage U_C1 input into the negative pin Pin6 of the second comparator 2.32 is smaller than the second reference value U_Pin5 input into the positive pin Pin5, the second output end Pin7 of the second comparator 2.32 is in a high-level state and drives the MOSFET M1 to be turned on, and a damping resistor R12 is short connected, so that the power consumption on the damping resistor R12 is reduced and the output power of the whole circuit is improved.

When the dimmer is connected upstream the rectifying device 1 and the dimmer does not reach the predetermined dimming level, the first evaluating voltage U_C1 input into the negative pin Pin6 of the second comparator 2.32 is bigger than the second reference value U_Pin5, the second output end Pin7 of the second comparator 2.32 is in a low-level state, the MOSFET M1 is in an open-circuit state without any driving voltage, and the damping resistor R12 is connected in the damping device 3 and causes power loss at the same time.

Figure 4:
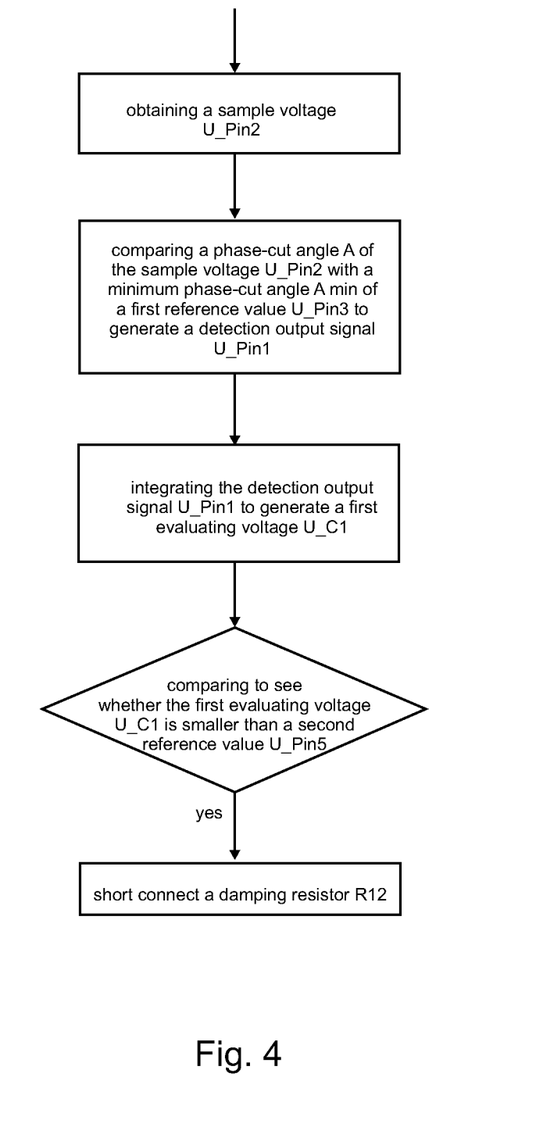
FIG. 4 is a flow diagram of a method according to the present disclosure.

FIG. 4 is a flow diagram of a method according to the present disclosure. Firstly, the sample voltage U_Pin2 having the phase-cut angle A is obtained and may be compared with the first reference value U_Pin3 having the minimum phase-cut angle Amin in the phase-cut angle detecting device 2.2, so that the detection output signal U_Pin1 is obtained. The first or second control signal S1, S2 for the switch module is generated upon processing the detection output signal U_Pin1 in the rectangular wave form and comparing the same with the predetermined second reference value U_Pin5 in the second comparator 2.32.

Figure 5:
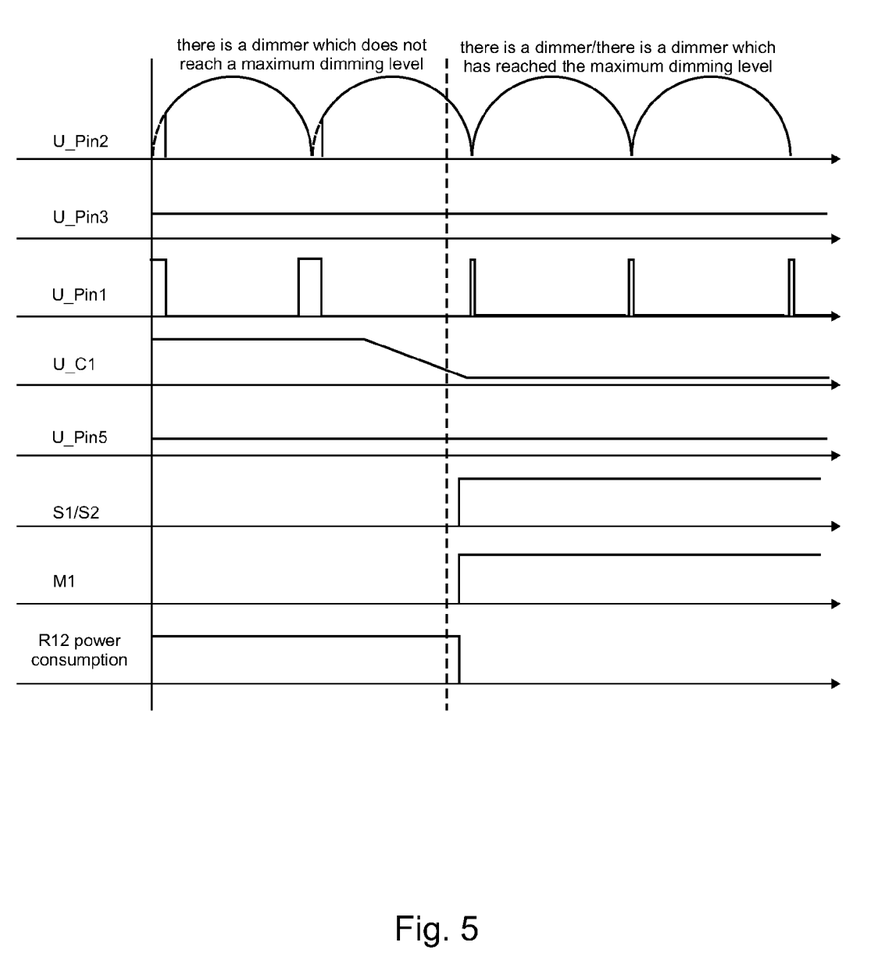
FIG. 5 shows diagrams of signal waveforms corresponding to respective steps in FIG. 4.

Upon comparison of the diagrams of signal waveforms corresponding to respective steps shown in FIG. 5, it can be seen that, when the dimmer is not connected upstream the rectifying device or the dimmer reaches the predetermined dimming level, the phase-cut angle A of the sample voltage U_Pin2 is small, and the rectangular detection output signal U_Pin1 having a small duty cycle is obtained upon comparing the sample voltage U_Pin2 with the predetermined first reference value U_Pin3 having the minimum phase-cut angle Amin. Thus, the first evaluating voltage U_C1 in a low-level state is obtained at both ends of integrating capacitor C1. The first control signal S1 in a high-level state is output after comparing the first evaluating voltage U_C1 with the predetermined second reference value U_Pin5 in the second comparator 2.32. The MOSFET M1 is turned on by the first control signal S1, so that the damping resistor R12 is short connected, i.e., there is no power loss on the damping resistor R12.

On the contrary, when the dimmer that does not reach the predetermined dimming level is not connected upstream the rectifying device 1, the phase-cut angle A of the sample voltage U_Pin2 is big, and is compared with the predetermined first reference value U_Pin3 having the minimum phase-cut angle Amin to obtain the rectangular detection output signal U_Pin1 having a big duty cycle. As a result, the first evaluating voltage U_C1 in a high-level state is obtained at both ends of the integrating capacitor C1. The second control signal S2 in a low-level state is output upon comparing the first evaluating voltage U_C1 with the predetermined second reference value U_Pin5 in the second comparator 2.32. The MOSFET M1 is turned off by the second control signal S2, so that the damping resistor R12 is connected in the damping device 3, i.e., there is power loss on the damping resistor R12.

Figure 6:
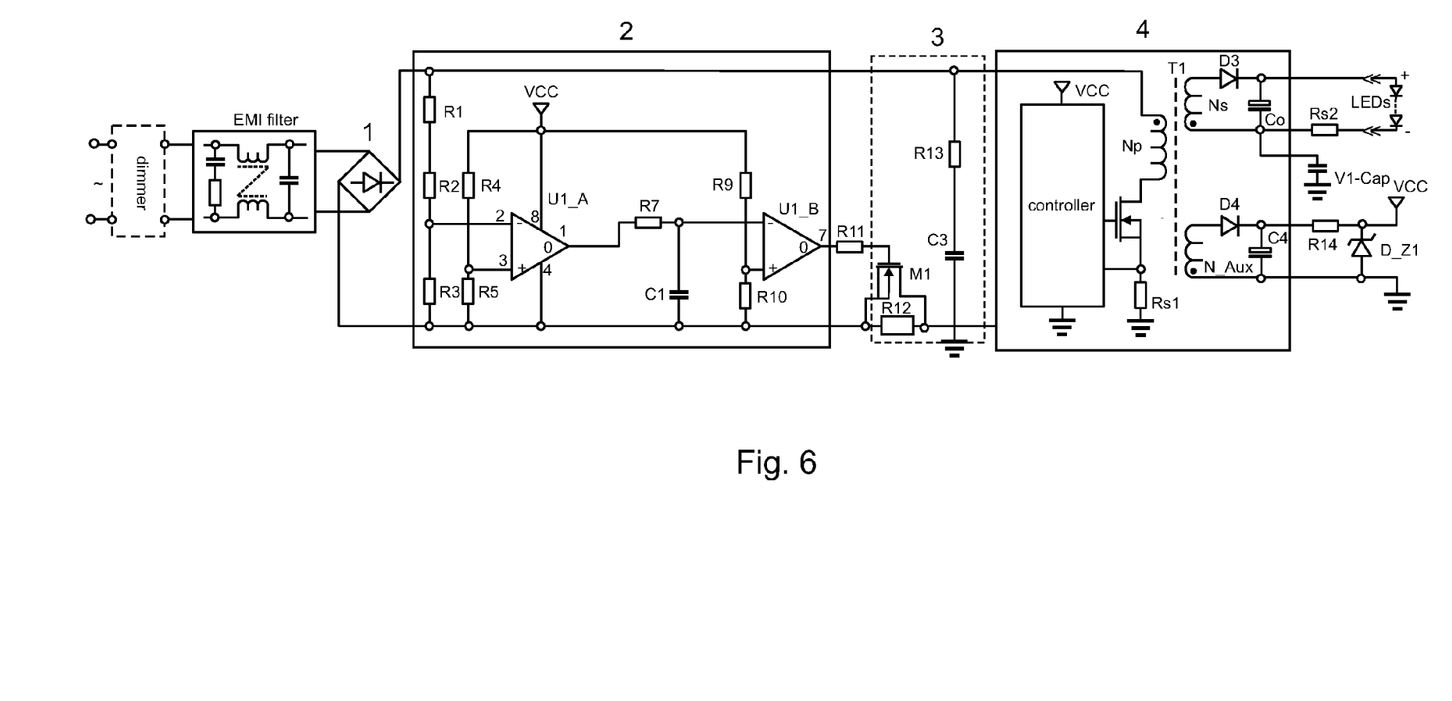
FIG. 6 is a diagram of a driving circuit having an illumination control system according to the present disclosure.

FIG. 6 is a diagram of a driving circuit having an illumination control system according to the present disclosure. It can be seen from FIG. 6 that no matter whether the dimmer is connected upstream the rectifying device 1, or the dimmer is in different states, the illumination control system according to the present disclosure can make recognition according to practical situation and further control to short connect the damping resistor R12 where it is unnecessary to inhibit flickering, so as to assure to supply an output power as big as possible to the illuminating device.

It should be noted that both the first reference and the second reference value related to the present disclosure are parameters predetermined according to practical applications, and may be set or adjusted by the person skilled in the art upon, for instance, analog simulation or computation. In addition, the first comparator and the second comparator according to the present disclosure may be integrated into a single chip, e.g. LM358. Such integrated configuration not only can save the structural space but also can be easy for debugging.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS 1 rectifying device
2 recognizing control circuit
2.1 voltage sampling device
2.2 phase-cut angle detecting device/first comparator
2.3 evaluating device
2.31 integrating device
2.32 second comparator
2.4 switch module
3 damping device
4 load circuit
A phase-cut angle
Amin minimum phase-cut angle
C1 integrating capacitor
M1 MOSFET
Pin1 first output end of the first comparator
Pin2 negative pin of the first comparator
Pin3 positive pin of the first comparator
Pin5 positive pin of the second comparator
Pin6 negative pin of the second comparator
Pin7 second output end of the second comparator
R1, R2, R3 resistor
R7 integrating resistor
R11 switch drive resistor
R12 damping resistor
S1 first control signal
S2 second control signal
U_Pin1 detection output signal
U_Pin2 sample voltage
U_Pin3 first reference value
U_Pin5 second reference value
U_C1 first evaluating voltage
Vref1 first reference voltage source
Vref2 second reference voltage source

The invention claimed is:

1. An illumination control system, comprising:
a rectifying device,
a damping device for inhibiting flickering, and
a load circuit,
wherein the illumination control system further comprises a recognizing control circuit connected between the rectifying device and the damping device, and
wherein the recognizing control circuit comprises a recognizing signal output module and a switch module, the recognizing signal output module generates a first control signal indicating that a dimmer is not connected upstream the rectifying device or the dimmer is connected upstream the rectifying device and reaches a predetermined dimming level and a second control signal indicating that the dimmer is connected upstream the rectifying device and does not reach the predetermined dimming level and at least one damping resistor of the damping device is short connected or is connected by means of the switch module according to the first control signal or the second control signal,
wherein the recognizing signal output module comprises a voltage sampling device configured to sample a voltage output from the rectifying device to output a sample voltage, a phase-cut angle detecting device configured to detect a phase-cut angle of the sample voltage to output a detection output signal, and
an evaluating device configured to evaluate the detection output signal to generate the first control signal or the second control signal.

2. The illumination control system according to claim 1, wherein the voltage sampling device comprises a plurality of resistors in serial connection.

3. The illumination control system according to claim 1, wherein the phase-cut angle detecting device is a first comparator that compares the phase-cut angle of the sample voltage with a minimum phase-cut angle of a first reference value to output the detection output signal.

4. The illumination control system according to claim 3, wherein the first comparator outputs the detection output signal in a low-level state of the first control signal when the phase-cut angle is smaller than the minimum phase-cut angle; and the first comparator outputs the detection output signal in a high-level state of the second control signal when the phase-cut angle is bigger than the minimum phase-cut angle.

5. The illumination control system according to claim 3, wherein the first reference value is supplied by a first reference voltage source.

6. The illumination control system according to claim 5, wherein the first reference is input into a positive pin of the first comparator, the sample voltage is input into a negative pin of the first comparator, and a first output end of the first comparator outputs the detection output signal.

7. The illumination control system according to claim 3, wherein the evaluating device comprises an integrating device configured to integrate the detection output signal to obtain a first evaluating voltage, and a second comparator that compares the first evaluating voltage with a second reference value predetermined to output the first control signal or the second control signal.

8. The illumination control system according to claim 7, wherein the integrating device is an RC circuit, wherein an integrating resistor is connected between the first output end of the first comparator and a negative pin of the second comparator, and an integrating capacitor has one end connected between the first output end of the first comparator and the negative pin of the second comparator, and the other end connected to ground.

9. The illumination control system according to claim 8, wherein the second reference value is input into a positive pin of the second comparator, and the first evaluating voltage is input into the negative pin of the second comparator, and a second output end of the second comparator outputs the first control signal or the second control signal.

10. The illumination control system according to claim 9, wherein the second reference value is supplied by a second reference voltage source.

11. The illumination control system according to claim 1, wherein the switch module comprises a switch component that is in parallel connection with the damping resistor and is turned on according to the first control signal to short connect the damping resistor, or turned off according to the second control signal to connect the damping resistor in the damping device.

12. The illumination control system according to claim 11, wherein the switch component is a MOSFET.

13. The illumination control system according to claim 12, wherein the switch module further comprises a switch drive resistor that is connected, at one end, to a second output end of the second comparator, and at the other end, to a gate of the MOSFET.

14. The illumination control system according to claim 8, wherein the first comparator and the second comparator are integrated into a single chip.

15. A method of controlling the illumination control system,
the illumination control system, comprising: a rectifying device,
a damping device for inhibiting flickering, and
a load circuit,
wherein the illumination control system further comprises a recognizing control circuit connected between the rectifying device and the damping device, and wherein the recognizing control circuit comprises a recognizing signal output module and a switch module, the recognizing signal output module generates a first control signal indicating that a dimmer is not connected upstream the rectifying device or the dimmer is connected upstream the rectifying device and reaches a predetermined dimming level and a second control signal indicating that the dimmer is connected upstream the rectifying device and does not reach the predetermined dimming level and at least one damping resistor of the damping device is short connected or is connected by means of the switch module according to the first control signal or the second control signal, the method comprising:
generating a first control signal indicating that a dimmer is not connected upstream a rectifying device or, the dimmer is connected upstream the rectifying device and reaches a predetermined dimming level or a second control signal indicating that the dimmer is connected upstream the rectifying device and does not reach the predetermined dimming level; and
being short connected or connecting at least one damping resistor of a damping device by means of a switch module according to the first control signal or the second control signal;
obtaining a voltage output from the rectifying device and outputting a sample voltage to a phase-cut angle detecting device via a voltage sampling device;
generating a detection output signal upon comparing a phase-cut angle of the sample voltage with a minimum phase-cut angle of a first reference value and outputting the detection output signal to an evaluating device; and
integrating the detection output signal to generate a first evaluating voltage and comparing the first evaluating voltage with a second reference value predetermined to generate a first control signal or a second control signal.

16. The method according to claim 15, wherein the phase-cut angle is detected in said obtaining: outputting the detection output signal in a low-level state when the phase-cut angle is smaller than the minimum phase-cut angle; and outputting the detection output signal in a high-level state when the phase-cut angle is bigger than the minimum phase-cut angle.

17. The method according to claim 15, wherein the first control signal or the second control signal is generated in said integrating: in the evaluating device, outputting the first control signal in a high-level state upon comparing a first evaluating voltage obtained by integrating the detection output signal with the second reference value when the detection output signal input is in a low-level state, and outputting the second control signal in a low-level state upon comparing the first evaluating voltage obtained by integrating the detection output signal with the second reference value when the detection output signal input is in a high-level state.

* * * * *